J. A. HARRINGTON.
MEASURING DEVICE FOR HATTERS' USE.
No. 191,674. Patented June 5, 1877.
Fig.1. Fig.2.
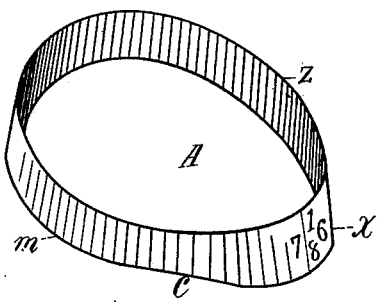 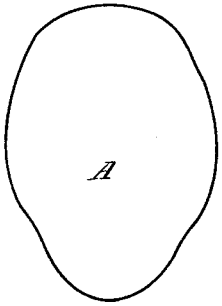
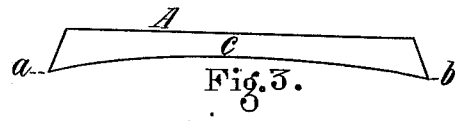
Fig.3.
Fig.4.
Witnesses: Inventor:
Jeremiah A. Harrington
per C. C. Shaw
Atty.
N. PETERS, PHOTO-LITHOGRAPHER, WASHINGTON, D. C.

UNITED STATES PATENT OFFICE.

JEREMIAH A. HARRINGTON, OF BOSTON, MASSACHUSETTS.

IMPROVEMENT IN MEASURING DEVICES FOR HATTERS' USE.

Specification forming part of Letters Patent No. 191,674, dated June 5, 1877; application filed April 5, 1877.

*To all whom it may concern:*

Be it known that I, JEREMIAH A. HARRINGTON, of Boston, in the county of Suffolk, State of Massachusetts, have invented certain new and useful Improvements in Measuring Devices for Hatters' Use, of which the following is a description sufficiently full, clear, and exact to enable any person skilled in the art or science to which my invention appertains to make and use the same, reference being had to the accompanying drawing, forming a part of this specification, in which—

Figure 1 is an isometrical perspective view of the band before it is used; Fig. 2, a plan view, showing the band after it has been used; Fig. 3, a side elevation of the band; and Fig. 4, a view showing the method of applying the band in taking a measurement of the head.

Like letters of reference indicate corresponding parts in the different figures of the drawing.

My invention relates to that class of measuring implements which are employed by hatters in the measurement of the head, or in determining its configuration or form; and consists in a slightly-flaring non-elastic endless band, curved or concaved longitudinally on its longest edge or rim, as hereinafter fully set forth and claimed, by which a simpler, cheaper, and more effective device of this character is produced than is now in ordinary use.

In the drawing, A represents the endless band, the figures $x$ showing the size of the head or hat for which it is adapted or designed. This band is preferably made of a strip of soft sheet metal or metallic compound, such as lead or "block-tin," and is about one and one-quarter inch in width and one-eighth of an inch in thickness. It is slightly flaring, the edge $m$ being longer than the edge $z$, enabling it to be pressed easily over the head in use, and to shed the cast readily which is subsequently formed. The edge or rim $m$ is also cut out or gradually concaved from $a$ to $b$ on the corresponding sides of the band, which is narrowest at $c$. The object of this concavity of the sides is to enable an accurate measurement of the head to be taken, the bearing or supporting surfaces of the head relatively to the hat being highest at the sides $c$ and lowest at the front and rear $a$ $b$.

In the use of my improvement the band is applied with the edge $m$ uppermost, and forcibly crowded downwardly over the head until in the proper position for obtaining a correct measurement for the hat. Being composed of a soft non-elastic material, the process of crowding or pressing the band downwardly, as described, aided by a slight lateral pressure at the proper points, will cause it to fit itself to the head, so that, when it has arrived at the position where the measurement should be taken, it will have assumed a shape corresponding with the shape of the head on the same plane. The band is then carefully removed and placed in a horizontal position on a convex table or block, with the rim or edge $m$ uppermost, after which a segmental or sectional cast of the head is taken by means of liquid plaster-of-paris poured into the band, which serves as a matrix or mold, the cast being easily used by the hatter in giving the proper form or configuration to the hat, in a manner which will be readily understood without a more explicit description by all conversant with such matters.

Instead of taking the plaster cast, as described, the proper shape for the hat may be ascertained by placing the band, after its removal from the head, on a sheet of paper and tracing or outlining it with a pencil, although I consider the cast preferable.

It will be understood that the convexity of the bed or table on which the band is placed in making the cast should correspond with the concavity of the lower edge $m$ of the band; also, that a series of bands are to be employed by the hatter adapted to the different sizes of hats ordinarily worn.

I do not confine myself strictly to the use of a flaring band, or to one concaved, as described, as the same general results may be obtained by the employment of a plain band, although, for obvious reasons, a plain band would be less effective in obtaining a correct measurement, and not so easily detachable from the cast.

Having thus explained my invention, what I claim is—

1. A configurator or measuring device for hatters' use, consisting of the endless band A, composed of a soft non-elastic metal or metallic compound, substantially as set forth and specified.

2. The non-elastic metal band A, having its edge m longer than its edge z, substantially as and for the purpose specified.

3. A configurator for hatters' use, consisting of the flaring non-elastic metallic band A, having its edge or rim m concaved, substantially as shown and described.

4. In the art of hat-making, the process of obtaining a block or cast of the hat-supporting portions of the head, by means of the band A applied to the head and subsequently used as a mold, substantially as and for the purpose set forth and specified.

JEREMIAH A. HARRINGTON.

Witnesses:
   C. A. SHAW,
   J. G. SHAW.